March 30, 1937. H. T. TUCKER 2,075,374
SADDLE FLOAT
Filed Oct. 21, 1935 2 Sheets-Sheet 1
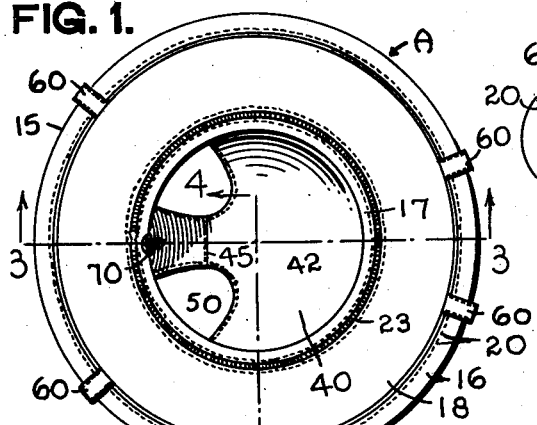
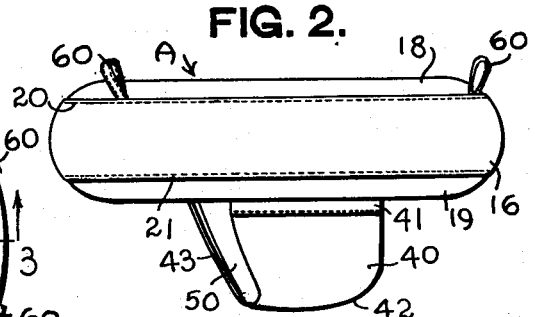
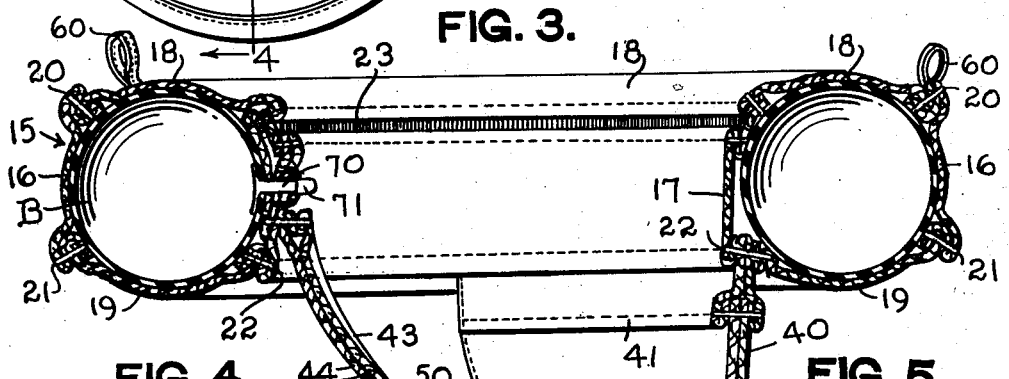
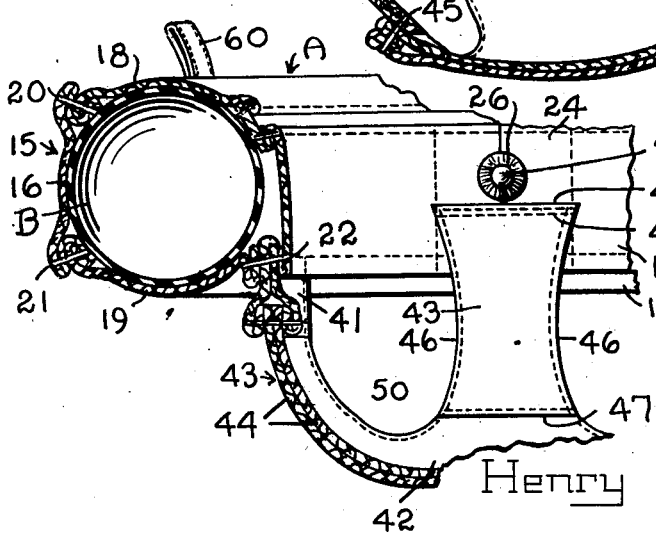
INVENTOR.
Henry Temple Tucker
BY Lancaster, Allwine and Rommel
ATTORNEYS.

March 30, 1937. H. T. TUCKER 2,075,374
SADDLE FLOAT
Filed Oct. 21, 1935   2 Sheets-Sheet 2
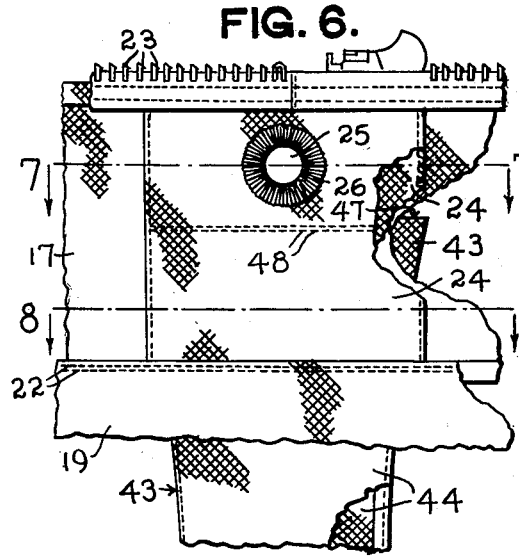
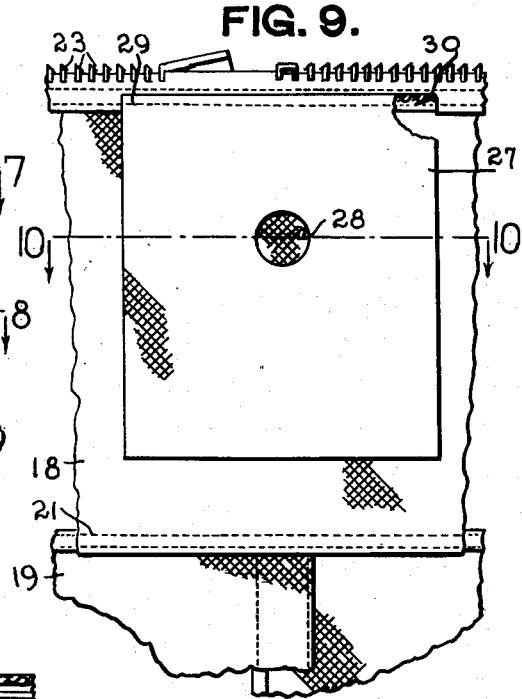
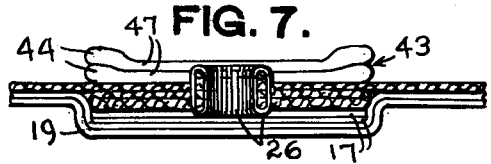
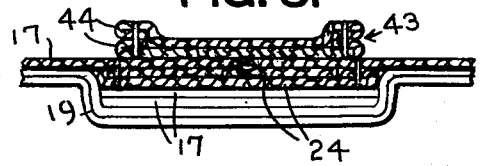
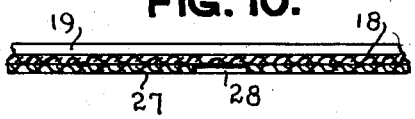
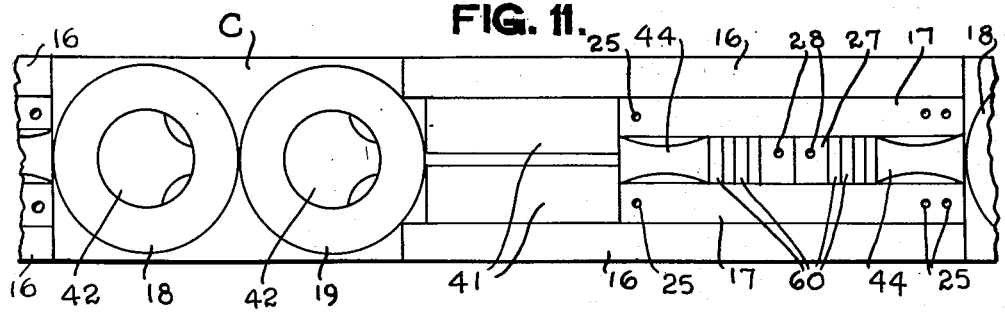
INVENTOR,
Henry Temple Tucker
BY Lancaster, Allwine & Rommel
ATTORNEYS.

Patented Mar. 30, 1937

2,075,374

UNITED STATES PATENT OFFICE 2,075,374

SADDLE FLOAT

Henry Temple Tucker, Fort Smith, Ark.

Application October 21, 1935, Serial No. 46,023

6 Claims. (Cl. 9—17)

This invention relates to floats and more particularly to a saddle float.

The principal object of the invention is to provide a saddle float preferably employing, in conjunction therewith, a conventional automobile tire inner tube, and so constructed that the occupant using the float will remain in a comfortable, seated position, and not gradually move forward or backward, an undesirable characteristic of some saddle floats.

Another important object is to provide such a float wherein the occupant is seated on the saddle below the horizontal plane of the bottom face of the float portion, yet movement of his arms is not impeded.

Still another object of the invention is to provide a saddle float so constructed that the legs of the occupant are not impeded in movement.

Another object is to provide a particularly strong and sturdy construction for a saddle float, equipped with reinforcing elements having dual functions.

Another object is to provide a saddle float which may be compacted, when not in use, into a small package, taking up but little room for storage and transportation.

Other objects and advantages of the invention will be apparent during the course of the following detailed description, taken in connection with the accompanying drawings, forming a part of this specification and in which drawings:—

Figure 1 is a top plan view of the inflated saddle float.

Figure 2 is an end elevation thereof.

Figures 3 and 4 are sections substantially on their respective lines of Figure 1.

Figure 5 is a view of a loop or eye provided for the novel float.

Figure 6 is a fragment of the front portion of the novel saddle float, viewed from the inside of the float boxing and looking towards the rear portion thereof.

Figures 7 and 8 are sectional views substantially upon their respective lines of Figure 6.

Figure 9 is a fragment of the front portion of the novel float, viewed from the inside of the float boxing and looking towards the outer front wall of the boxing.

Figure 10 is a section substantially upon the line 10—10 of Figure 9.

Figure 11 is a pattern assembly of the parts making up the complete saddle float.

In the drawings, wherein for the purpose of illustration is shown only a preferred embodiment of the invention, and wherein similar characters designate corresponding parts thruout the several views, the letter A designates generally the novel saddle float, the letter B a float insert therefor and the letter C a section of material from which the parts making up the complete saddle float may be cut.

The novel saddle float A includes a preferably ring-shaped tubular portion or boxing 15 of pliable material, such as canvas, and comprising, in the main, an outer boxing strip 16, an inner boxing strip 17, an upper boxing strip 18 and a lower boxing strip 19. Preferably the outer boxing strip 16 is permanently secured to the upper boxing strip 18 at their overlapping edges, as by stitches 20, the outer boxing strip 16 is permanently secured to the lower boxing strip 19 at their overlapping edges, as by stitches 21, the lower boxing strip 19 is permanently secured to the inner boxing strip 17 of the overlapping edges, as by stitches 22, and the inner boxing strip 17 is detachably secured to the upper boxing strip 18, as by any approved means. In the example shown, the well-known detachable fasteners commonly known as zipper fasteners 23 are employed, these being so constructed that the entire adjacent edges to which they are affixed may be separated.

While a single ply of boxing strips has been found satisfactory, generally, it has been thought very desirable to double or lap the inner boxing strip 17 for a portion of its length, as shown particularly in Figures 7 and 8, so as to provide a reinforced section 24, having a valve stem-accommodating perforation 25, the edge of which may be protected, as in any approved way, as by stitches 26 overlying the edge, or by the well known grommet. This doubling or lapping of the inner boxing strip 17 extends the width of this strip.

As a protection for the member B, a loose flap 27 is provided, having a valve stem-accommodating perforation 28, concentric, when the saddle float is in use, with the perforation 25. This flap may be secured in any approved manner, as by stitches 29, at one doubled over edge 30, to the upper boxing strip 18 adjacent the zipper-carrying edge of the latter.

The saddle portion 40 of the novel saddle float A, includes a back strip or section 41, a seat strip or section 42 and a front section 43. While the seat strip or section 42, the front section 43 and the lower part of the back strip or section 41 may be a single length of material, it has been found, in the interest of economy, in order to conserve material, to construct the front section 43, or at least a part of it, of a separate piece of material 44, joined to the seat strip 42, as by stitches 45.

Preferably, the back strip or section 41 is made up of a folded-over or lapped strip, attached at the juncture of the edges of the inner boxing and lower boxing strips 17 and 19, by the stitches 22. This is shown particularly in Figure 3. With this construction, the back strip or section 41 hangs downwardly in a substantially vertical position and the pull of it upon the inner boxing strip 17, when the occupant is seated, is such that it and the inner boxing strip also, assume a substantially vertical position. Thus, the back section of the saddle portion 40 is substantially vertical. Of course, the back strip or section 41 extends only part way around the inner periphery of the portion 15, as shown in Figures 2, 3 and 4. Where there is no pull upon the inner boxing strip 17, by the back strip 41, the inner boxing strip 17 conforms to the shape of the member B.

Preferably, the material making up the saddle portion 40 is two ply thruout and may be material similar to that making up the ring-like tubular portion 15.

By referring particularly to Figure 3, it will be seen that the front section 43 of the saddle portion 40 does not hang vertically but slopes towards the seat 42 in a decided curve, which is concave to the seated occupant. The outer edges 46 of the front section 43 are preferably concave, as shown particularly in Figure 4, but its other edges 47 are preferably straight and the width of the section 43 at the edge 47 which is secured to the inner boxing strip 17, as by stitches 48, is substantially the same or less than the width of the reinforced portion 24 of the inner boxing strip 17. It will be noted, particularly in Figure 3, that while both the back strip 41 and the front section 43 are secured to the tubular portion 15, below the center of gravity of the latter, the front section 43 is preferably secured to the tubular portion 15 well above the point where the back strip 41 is secured to the tubular portion 15. This arrangement, and the substantially vertical position of the back strip 41 and the sloping position of the front section 43 all contribute towards a very important end, i. e., the seating of the occupant in a position whereby he will not gradually move forward along the saddle, nor be apt to be pitched forward suddenly. In addition, he will have a very comfortable back rest, decidedly vertical rather than conforming to the contour of the member B.

As may be seen, particularly in Figures 1, 2 and 4, there is provided a pair of spaced-apart leg-accommodating openings 50, defined in part by the edges 46 of the front section 43 and the back strip 41 as well as the seat 42. These openings 50 do not face downwardly but, on the contrary, face forwardly, as is apparent from Figures 2, 3 and 4.

The saddle portion 40, while it bridges the ring-shaped tubular portion 15, sags downwardly well below the lower horizontal plane of the ring-like tubular portion 15, so that the occupant is seated well below the center of gravity of the saddle float. He is also seated so that his legs are free to move about, they may be moved into a position to form a right angle with the body, without being impeded by any portion of the saddle float, and, when they hang down, they hang in a natural, easy position. It is also apparent that with these forwardly opening leg-accommodating openings, the hunter occupant is not hampered in taking aim upwardly, and the fisherman occupant is not hampered in casting in any direction, as they would be if the leg-accommodating openings opened into the bottom of the saddle float.

As a means for securing the novel saddle float to the occupant or to a stationary object, a plurality of spaced apart loops or eyes 60 are provided and preferably secured to the outer periphery of the ring-like tubular portion 15 at the juncture of the outer and upper boxing strips 16 and 18 by the stitches 20. In the example shown, there are four such loops 60, so spaced that the occupant may, if he desires, loop his suspenders thru the loops 60 and then secure the suspender ends to his trousers.

The float insert B is preferably a conventional automobile tire inner tube of ring-like formation having distensible walls of rubber and a valve stem 70 for admitting air, under pressure, to the interior of the inner tube, and retain it there.

From Figure 11 it can be seen that a section of material C may be economically cut to provide the necessary parts to make up the novel saddle float, the parts being numbered in Figure 11 to correspond to the similar parts in the completed saddle float. As an example, a strip of thirty-one inch canvas may be employed for cutting out the several parts, leaving but little waste.

In use, the deflated or partly deflated inner tube is inserted into the ring-like tubular portion 15, the valve stem 70 being inserted into the perforation 28 of the flap 27 and then into the perforation 25 so that it projects outwardly from the inner periphery of the ring-like tubular portion 15. When the valve stem cap 70 is removed and air, for instance, pumped into the inner tube, the latter will distend and cause the saddle float to take its proper shape. Upon replacing the valve cap 71 and adjusting the zippers to their closed position, the saddle float is ready for use. The occupant may insert his legs through the openings 50 and secure the saddle float to his person as suggested. Entering the water, he may sit down upon the saddle seat and propel himself about or to a suitable location, the buoyancy of the saddle float sustaining him upon the surface of the water, with his legs in the water and, perhaps, out of contact with the bed of the body of water, but his arms clear. The occupant may rest his back upon the back rest of the saddle float, and without any tendency of his body to slide forward, due to the sloping front portion of the saddle. He may rest his elbows, arms and rod or gun upon the upper surface of the saddle float, remaining for hours in a comfortable position.

The inner tube may be deflated and the saddle float removed, as is now apparent, and folded into a compact, small parcel for transportation and storage.

Various changes may be made to the form of invention herein shown and described, without departing from the spirit of the invention or the scope of the claims.

What is claimed is:

1. In a saddle float adapted to accommodate a distended tubular member having a valve stem extending inwardly from its inner periphery towards its axis, a boxing of pliable material surrounding said tubular member and having an opening through which said valve stem protrudes, the material constituting said boxing being doubled upon itself about said opening, and a saddle portion attached to and bridging said boxing in a sagging position, this saddle portion being partly secured to said boxing upon said doubled boxing material.

2. In a saddle float adapted to accommodate a distended tubular member having a valve stem extending from its inner periphery, a boxing of pliable material surrounding said tubular member and having an opening through which said valve stem protrudes, the material constituting said boxing being doubled upon itself about and below said opening, and a saddle portion attached to and bridging said boxing in a sagging position, said saddle portion being partly secured to said boxing upon said doubled boxing material at portions thereof below said opening.

3. In a saddle float adapted to accommodate a distended tubular member having a valve stem extending from its inner periphery, a boxing of pliable material surrounding said tubular member and having an opening through which said valve stem protrudes, the material constituting said boxing being doubled upon itself about and below said opening, and a saddle portion attached to and bridging said boxing in a sagging position, said saddle portion being partly secured to said boxing upon said doubled boxing material at portions thereof below said opening and extending therefrom in a curve towards the bottom of said saddle portion.

4. In a saddle float adapted to accommodate a distended tubular member having a valve stem extending from its inner periphery, a boxing of pliable material surrounding said tubular member and having an opening through which said valve stem protrudes, the material constituting said boxing being doubled upon itself about and below said opening, and a saddle portion attached to and bridging said boxing in a sagging position, said saddle portion having a pair of spaced apart leg-accommodating openings and being partly secured to said boxing upon said doubled boxing material at portions thereof below said opening and extending therefrom in a curve towards the bottom of said saddle portion, and with said leg-accommodating openings disposed to either side of said curved saddle portion.

5. In a saddle float adapted to accommodate a removable float, a ring-shaped tubular float portion of pliable material including an inner boxing strip, an outer boxing strip and upper and lower boxing strips, two of said strips being detachably secured together at their adjacent edges, and a saddle portion secured to and bridging said ring-shaped tubular float portion in a sagging position, the rear section of said saddle portion being secured to said ring-shaped tubular float portion at the juncture of the adjacent edges of said inner boxing strip and said lower boxing strip, and the forward section of said saddle portion being secured to said inner boxing strip above the juncture of the adjacent edges of said inner boxing strip and said lower boxing strip.

6. In a float of the class described, a hollow ring-shaped portion, and a saddle portion secured to and extending across said ring-shaped portion in a sagging position with the rearward wall of said saddle portion being secured and depending from the inner periphery of said hollow ring-shaped portion and the forward wall of said saddle portion being secured to and sloping from the inner periphery of said hollow ring-shaped portion, said forward wall being secured at a location above the point of attachment of said rearward wall to said hollow ring-shaped portion and said saddle portion sloping downwardly toward said rearward wall and being provided with leg-accommodating openings, whereby, because said forward wall of said saddle portion is secured to said ring-shaped portion at a location above that of said rearward wall, an occupant of said float will not gradually move forwardly on said saddle nor be suddenly pitched forward.

HENRY TEMPLE TUCKER.